Patented Apr. 14, 1953

2,635,086

UNITED STATES PATENT OFFICE 2,635,086

EMULSION POLYMERIZATION PROCESS

Forrest H. Norris, Springfield, Mass., assignor to Monsanto Chemical Company, St. Louis, Mo., a corporation of Delaware No Drawing. Application April 12, 1951, Serial No. 220,731

7 Claims. (Cl. 260—29.6)

This invention relates to a process for the polymerization in aqueous emulsion of aromatic compounds containing ethylenic unsaturation in a side chain attached to the aromatic nucleus. More particularly the process relates to an emulsion polymerization process which provides stable emulsions containing from 40 to 60% solids.

Aqueous emulsions of polymers of aromatic compounds containing ethylenic unsaturation in a side chain attached to the aromatic nucleus are beginning to find favor in surface coating and paper and fabric impregnation applications. For these uses it is necessary to have an emulsion which has a high solid content, shows no tendency to settle or thicken during extended storage, is not broken by successive freezing and thawing and is substantially uniform throughout especially as to particle size of the polymer in the emulsion.

Prior to this invention, most of the emulsions have contained a maximum of about 35% solids since attempts to use the usual emulsion polymerization methods at higher solids content have resulted in lumpy, non-homogeneous and unstable emulsions which could not be fabricated into clear homogeneous films. In particular, it has been found nearly impossible to prepare such high solids emulsions which are stable to successive freezing and thawing conditions such are likely to be encountered when shipping and storing the emulsions.

One object of this invention is to provide a stable high solids emulsion of a polymer of an aromatic compound containing ethylenic unsaturation in a side chain attached to the aromatic nucleus.

Another object is to provide a process for the preparation of stable emulsions of polymers of said aromatic compounds.

Still another object is to provide an aqueous emulsion process for the polymerization of aromatic compounds containing ethylenic unsaturation in a side chain attached to the aromatic nucleus of obtain stable emulsions of the polymers, said emulsions containing from 40 to 60% solids.

These and other objects are attained by employing as emulsifying agents, materials which are soluble in the monomer, and by the steps of dissolving the emulsifying agent in the monomer followed by the gradual addition of this solution to the aqueous phase of the polymerization system.

The following examples are given in illustration and are not intended as limitations of the scope of this invention. Where parts are mentioned they are parts by weight.

Example I

A solution is prepared by dissolving 0.5 part of the sodium salt of dioctyl sulfosuccinate in 50 parts of substantially pure monomeric styrene. The solution is then gradually added to 40 parts of water over a period of about two hours. During the addition, the water is maintained at reflux temperature and atmospheric pressure accompanied by constant agitation. Simultaneously with the addition of the monomer solution, a solution of 0.4 part of potassium persulfate in 10 parts of water is added to the reaction medium. The catalyst addition is also made gradually but more slowly than the monomer addition so that the last of the catalyst is added about fifteen minutes after all of the monomer is in the reaction medium. The reaction medium is then heated further at reflux temperature and atmospheric pressure under constant agitation for about 45 minutes additional. At the end of this time the reaction is substantially complete. The product obtained on cooling is a smooth, stable emulsion having a viscosity of about 5–15 cps. and a pH of about 6.7. Substantially no lumps or agglomerates of polymer can be detected in the emulsion. Furthermore the emulsion is stable to shear and mechanical agitation. It is further observed that throughout the reaction, the reaction medium is a relatively thin fluid.

When the Example is repeated with the exception that the emulsifying agent is added to the water instead of the monomer, an extremely thick reaction medium is obtained and the emulsion produced is not stable to agitation or shear. In addition, the emulsion contains about 5% of large lumps or agglomerates.

Example II

A stable emulsion is prepared by dissolving 1 part of the sodium salt of mahogany acids in a mixture of 98 parts of styrene and 2 parts of methacrylic acid, and adding the solution gradually over about 100 minutes to 85 parts of water maintained at reflux temperatude and atmospheric pressure with constant agitation. A solution of 0.4 part of potassium persulfate in 16 parts of water is added gradually to the reaction medium over a period of three hours starting substantially simultaneously with the first addition of the monomer solution. The reaction medium is maintained under constant agitation throughout the reaction period. The reaction is continued for about 15 minutes after the last addition of catalyst and then the reaction vessel is cooled to room temperature. The product is a smooth 50% solids emulsion containing substantially no lumps or polymer agglomerates. The emulsion thus prepared is thoroughly mixed with 3.4 parts of ammonium hydroxide (28% ammonia). This modified emulsion is stable to repeated freezing and thawing and to shear and mechanical agitation. When subjected to the severe agitation of a Waring blender for 1 hour, no breaking of the emulsion occurs.

When Example II is repeated with the exception that all of the emulsifying agent is dissolved in the water, the reaction medium soon becomes a thick viscous slurry. An emulsion of polymer is obtained having from 2-5% of large lumps or polymer agglomerates. This emulsion is completely broken after only a few seconds when subjected to the agitation in a Waring blender. The emulsion is not freeze-thaw stable whether or not it is neutralized with ammonia.

*Example III*

A 60% solids emulsion is prepared by mixing 98 parts of styrene with 2 parts of methacrylic acid and dissolving therein 0.9 part of the sodium salt of dioctyl sulfosuccinate, adding the solution gradually to 60 parts of water accompanied by the gradual addition of a solution of 0.44 part of potassium persulfate in 7 parts of water. The reaction medium is maintained at reflux temperature and atmospheric pressure throughout the reaction accompanied by constant agitation. The addition of the catalyst solution is slower than that of the monomer solution so that the last of the catalyst is added about 15 minutes after the last of the monomer. The reaction is continued for about 30 minutes after the last addition of catalyst. The product is mixed with about 3 parts of 28% ammonium hydroxide on cooling. The emulsion obtained is smooth and devoid of lumps. It is stable to agitation and to successive freeze-thaw cycles. It is considerably more viscous than the emulsion of Example II.

*Example IV*

A plasticized emulsion may be prepared by the process of Example II. Only 64.5 parts of styrene and 1.5 parts of methacrylic acid are used. After the polymerization reaction is completed and the ammonium hydroxide has been added, 34 parts of dibutyl phthalate and 0.7 part of oleic acid are stirred into the emulsion. The plasticizer is quickly dispersed throughout the emulsion without causing it to break. When the emulsion thus produced is cast on a glass plate and allowed to dry, thin clear tough films are obtained which contain no graininess from outsize particles of emulsion. The plasticized emulsion is stable to agitation and to freeze-thaw cycles.

*Example V*

Example IV is repeated except that butyl benzyl phthalate is used as the plasticizer and the plasticizer is dissolved in the monomer along with the emulsifying agent prior to the polymerization step. A smooth stable 50% solids emulsion is obtained which can be cast to give clear tough films. However, when it is attempted to obtain an emulsion using the same ingredients but putting 10% of the emulsifying agent into the water instead of the monomer, the product is not as smooth and the films cast therefrom contain a milky haze.

The process of this invention is operable for the preparation of aqueous emulsions of polymers and copolymers of aromatic compounds having ethylenic unsaturation in a side chain attached to the aromatic nucleus. If copolymers are prepared, the aromatic compound should constitute at least 50% by weight of the copolymer. Among the aromatic compounds which may be used are styrene, vinyl naphthalene, vinyl diphenyl, related compounds in which the alpha hydrogen atom of the vinyl group is replaced by a halogen atom or an alkyl group, and derivatives thereof containing one or more substituents in the ring. Among such compounds are alpha chloro styrene, alpha methyl styrene, alpha ethyl styrene, o-, p-, and m-chloro styrenes, o-, p-, and m-methyl or ethyl styrenes, various dichlorostyrenes and dimethyl styrenes, diethyl styrenes, alpha methyl para methyl styrene, etc. These various aromatic compounds may be copolymerized with other compounds containing ethylenic unsaturation such as vinyl and vinylidene compounds, allyl compounds, butene dioic derivatives such as maleic acid and maleic esters, etc. In a preferred embodiment of this invention the comonomer is acrylic acid or an alpha alkyl acrylic acid in which the alkyl group contains no more than four carbon atoms, the acids being used in the ratio of from 1 to 3 parts per 99 to 97 parts of aromatic monomer. These copolymers have exceptional stability to storage, freeze-thaw cycles, agitation, etc. and in addition they provide films of superior clarity, toughness and resistance to ageing.

The amount and kind of emulsifying agent to be used is not critical except that it must be soluble in the monomer. Without such solubility, it is substantially impossible to obtain smooth emulsions containing from 40 to 60% solids. For example, when an emulsifying agent which is insoluble in the monomer is added to the reaction medium gradually and at the same rate as the monomer is added and with all other conditions remaining as shown in the above examples, a lumpy thick emulsion is obtained which is quite unstable. Some emulsifying agents such as sodium dodecyl benzene sulfonate are insoluble in the monomers at room temperature but may be dissolved in the monomers by raising the temperature of the monomers up to about 90° C. These emulsifying agents are ineffective to provide 40-60% solids emulsions if they are mixed with the monomers at room temperature but when dissolved in the monomers at higher temperatures they operate to yield smooth stable products.

Any of the peroxidic compounds may be used as polymerization catalysts in amounts which vary according to the monomer system, solids content of the final emulsion, type of emulsifying agent, etc. These catalysts and the effects of monomers and emulsifying agent on them are well-known. With respect to the effect of solids content on catalyst concentration, it has been found that an increase of about 10% by weight of catalyst is necessary for a 60% solids emulsion, compared to a 50% solids emulsion. For smooth operation of the process, it is preferred to use water-soluble catalysts, such as ammonium persulfate, which can be dissolved in a portion of the water used in the reaction system and then added in solution form to the reaction medium.

The solution of the emulsifying agent in the monomer should be added to the water slowly over an extended period of time. An excellent emulsion is obtained if at least one hour is consumed in the addition of the monomer solution to the water. For monomers which polymerize with great rapidity the addition may be shortened to about 30 minutes and for those which polymerize quite slowly the addition may take place over considerably longer periods e. g., up to about five hours.

The catalyst must also be added gradually and the rate of addition should be regulated so that at least a portion of the required catalyst is added after all of the monomer is in the reaction medium. The initial addition of catalyst should coincide with the initial addition of the monomer solution. For best results the catalyst addition should continue for at least fifteen minutes after the last monomer addition and it frequently is desirable that the entire amount of catalyst is not in the reaction medium until about one hour after all of the monomer is added.

As a matter of convenience it is preferred to carry out the emulsion polymerization at the reflux temperature at atmospheric pressure. Lower temperatures may be used, if desired, down to about 50° C. below the reflux temperature. At the lower temperatures, the speed of the polymerization reaction is reduced but the quality of the emulsion produced is unimpaired. Since the reflux temperature at the end of the reaction is approximately 100° C., the optimum temperature range for the reaction is from 50° C. to 100° C.

The particle size of the resins in the final emulsion varies between 0.15 and 0.35 microns which makes the emulsions particularly useful in coating compositions. When part or all of the emulsifying agent is added to the aqueous phase prior to addition of the monomer the particles size of the resins in the emulsion is drastically reduced, the major portion of the particles having a diameter of no more than 0.1 microns and averaging about 0.08 microns.

When it is desired to prepare a plasticized resin emulsion, either of two procedures may be used. In the first case, an emulsion may be prepared at a lower solids content and the plasticizer may be added to the completed emulsion. Secondly, the plasticizer may be dissolved in the monomer along with the emulsifying agent so that it is present throughout the polymerization reaction. The first method makes it possible to prepare large quantities of a basic emulsion which can then be plasticized according to particular needs. For the purposes of this invention, the plasticizer is considered as a part of the solids content of the emulsion even though, as in many cases, the plasticizer is a liquid.

Various conventional additives, such as stabilizers for the polymers, buffers, dyes, pigments, protective colloids etc. may be added either before the polymerization step or after the polymer emulsion has been formed. However, care must be taken that none of the additives, including the emulsifying agents and catalysts, introduces a substantial amount of polyvalent cation either into the reaction medium or into the finished emulsion. More than 100 parts of polyvalent cation per million parts of monomer will cause coagulation of the emulsion during the polymerization step and the same amounts added to the finished emulsion will cause coagulation. Compounds containing polyvalent metals, such as certain inorganic pigments like titanium dioxide, may only be used if the compounds are sufficiently insoluble in water to prevent ionization to yield the polyvalent cations.

The process of this invention makes it possible to prepare smooth stable emulsions which are relatively low in viscosity. For example, at 50% solids, the emulsions of this invention have a viscosity ranging from 10 to 50 centipoises whereas a similar emulsion made by adding the emulsifying agent partly or entirely to the aqueous phase has a viscosity ranging from 100 to 100,000 centipoises. It further makes it possible to obtain substantially complete polymerization of the aromatic monomers in a relatively short time to provide a stable emulsion which may be used directly as a water paint or combined with other resins and well-known paint ingredients to provide tough continuous surface coatings.

It is obvious that many changes may be made in the products and processes of this invention without departing from the spirit and scope thereof as defined by the appended claims.

What is claimed is:

1. A process for the polymerization in aqueous emulsion of an aromatic compound containing ethylenic unsaturation in a side chain attached to the aromatic nucleus, in the presence of a polymerization catalyst and an emulsifying agent which is soluble in the monomer, which comprises dissolving all of the emulsifying agent in the monomer, gradually adding the solution thus prepared to a body of water, adding the catalyst to the water at a rate relatively slower than the addition of the monomer solution, the first addition of catalyst being coincidental with the first addition of monomer, and then continuing the polymerization condition for at least fifteen minutes after all of the ingredients have been added, the aqueous medium being maintained under constant agitation and at a temperature of 50–100° C. throughout the addition steps and until the reaction is complete, said process being carried out in the substantial absence of polyvalent cations, the water to monomer ratio varying from 60:40 to 40:60.

2. A process as in claim 1 wherein the ratio of water to monomer is 50:50.

3. A process as in claim 1 wherein the ratio of water to monomer is 40:60.

4. A process as in claim 1 wherein the reaction is carried out at reflux temperature and atmospheric pressure.

5. A process as in claim 1 wherein from 97 to 99 parts of styrene are copolymerized with from 3 to 1 parts of a compound taken from the group consisting of acrylic acid and alpha alkyl substituted acrylic acids in which the alkyl groups contain from 1 to 4 carbon atoms.

6. A process as in claim 5 wherein 98 parts of styrene are polymerized with 2 parts of methacrylic acid and the water to monomer ratio is 50:50.

7. A process for polymerizing styrene in aqueous emulsion in the presence of potassium persulfate as polymerization catalyst and a sodium salt of mahogany acids as emulsifying agent, which comprises dissolving all of the emulsifying agent in 50 parts of styrene monomer, adding the solution thus formed to 50 parts of water with constant agitation over a period of one hour while maintaining the reaction medium at reflux temperature and atmospheric pressure, adding the catalyst to the reaction medium simultaneously with the addition of the monomer over a period of two hours, and continuing the reaction at reflux temperature with constant agitation for one hour after the last addition of catalyst, the reaction being carried out in the substantial absence of polyvalent cations.

FORREST H. NORRIS.

References Cited in the file of this patent

UNITED STATES PATENTS

| Number | Name | Date |
|---|---|---|
| 2,074,647 | Hagedorn et al. | Mar. 23, 1937 |
| 2,488,503 | Park et al. | Nov. 15, 1949 |